(12) United States Patent
Heitmann et al.

(10) Patent No.: US 9,756,786 B2
(45) Date of Patent: Sep. 12, 2017

(54) COMBINE HARVESTER

(71) Applicant: CLAAS SELBSTFAHRENDE ERNTEMASCHINEN GMBH, Harsewinkel (DE)

(72) Inventors: Christoph Heitmann, Warendorf (DE); Andreas Wilken, Bissendorf (DE); Joachim Baumgarten, Beelen (DE); Sebastian Neu, Bad Laer (DE); Christoph Bussmann, Harsewinkel (DE); Henner Voecking, Rietberg (DE); Stefan Teroerde, Warendorf (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 0 days.

(21) Appl. No.: 15/083,606

(22) Filed: Mar. 29, 2016

(65) Prior Publication Data

US 2016/0286720 A1 Oct. 6, 2016

(30) Foreign Application Priority Data

Apr. 2, 2015 (DE) .......................... 10 2015 004 344

(51) Int. Cl.
*A01D 41/127* (2006.01)
*G05B 13/02* (2006.01)
(Continued)

(52) U.S. Cl.
CPC ....... *A01D 41/127* (2013.01); *A01D 41/1273* (2013.01); *A01F 12/18* (2013.01); *G05B 13/02* (2013.01); *G05B 17/02* (2013.01)

(58) Field of Classification Search
CPC ... A01D 41/1273; A01D 41/127; A01F 12/18; G05B 17/02; G05B 13/02
See application file for complete search history.

(56) References Cited

U.S. PATENT DOCUMENTS

| 7,670,218 B2 | 3/2010 | Behnke et al. |
| 8,406,964 B2 | 3/2013 | Baumgarten et al. |
| (Continued) | | |

FOREIGN PATENT DOCUMENTS

| DE | 10 2009 009 767 | 8/2010 |
| EP | 1 543 712 | 6/2005 |
| (Continued) | | |

OTHER PUBLICATIONS

Spokas et al. Impact of wheat stubble height on combine technological parameters, Journal of Food, Agriculture & Environment, vol. 8(2):464-468, 2010.*

*Primary Examiner* — Yuen Wong
(74) *Attorney, Agent, or Firm* — Michael J. Striker (57) ABSTRACT

A combine harvester has a threshing unit for threshing picked-up crop to obtain grain, a driver assistance system for controlling the threshing unit which has a memory for storing data and a computing unit for processing the data stored in the memory. A functional system model for at least a portion of the combine harvester is stored in the memory. The computing unit is designed to carry out an autonomous determination of at least one threshing-unit parameter on a basis of the system model and, for depicting functional interrelationships, at least one family of characteristics (A-J) is assigned to at least one harvesting-process parameter. The at least one harvesting-process parameter is defined as an output variable of the at least one family of characteristics (A-J).

33 Claims, 7 Drawing Sheets

(51) Int. Cl.
    *G05B 17/02*     (2006.01)
    *A01F 12/18*     (2006.01)

(56) References Cited

U.S. PATENT DOCUMENTS

| | | |
|---|---|---|
| 9,125,344 B2 | 9/2015 | Baumgarten et al. |
| 9,403,536 B2 | 8/2016 | Bollin et al. |
| 2010/0217474 A1* | 8/2010 | Baumgarten ........ A01D 41/127 701/31.4 |

FOREIGN PATENT DOCUMENTS

| | | |
|---|---|---|
| EP | 1 731 017 | 12/2006 |
| EP | 1 902 609 | 3/2008 |
| EP | 2 687 924 | 1/2014 |
| EP | 2 728 523 | 5/2014 |
| EP | 2 837 279 | 2/2015 |

\* cited by examiner

COMBINE HARVESTER

CROSS-REFERENCE TO A RELATED APPLICATION

The invention described and claimed hereinbelow is also described in German Patent Document DE 10 2015 004 344.7, filed on Apr. 2, 2015. The German Patent Application, the subject matters of which is incorporated herein by reference, provides the basis for a claim of priority of invention under 35 U.S.C. 119(a)-(d).

BACKGROUND OF THE INVENTION

The present invention relates to a combine harvester with a threshing unit and a driver assistance system which controls the threshing unit, the driver assistance system including a memory for storing data, and a computing unit for processing the data stored in the memory.

Combine harvesters are used for mowing and threshing of grain. The threshing is carried out by a threshing unit, which obtains grain from the crop picked up by the combine harvester using a header. The grain, after threshing, separation and subsequent cleaning, is fed to a grain tank. The chaff and the straw, for example, remain as further components of the crop and are either spread onto the field or, in the case of straw, can be set down as swath, e.g., to be subsequently picked up by a baler. Here and in the following, the term "crop" is intended to mean the entirety of the crop stream picked up by the threshing unit, i.e., including the grains that have not yet been obtained as grain from the crop, and the grains that may remain in the crop stream as a loss and that may be deposited with the straw.

In the threshing unit, the grain is rubbed, i.e., threshed, out of the straw by a processing, which comprises rolling, in principle, and is separated from the remaining crop stream, so that it can be fed directly to the cleaning system. The remaining crop stream is then fed to the separation area in which the remaining grain is separated from the crop stream, e.g., by a straw-walker system and is then likewise fed to the cleaning system.

There is an entire series of criteria, on the basis of which the quality of the threshing process can be evaluated. First, preferably all the grain should be removed from the crop stream and fed to the grain tank, specifically with as few broken kernels as possible, and with a minimal portion of material other than grain. Secondly, the straw also should not be damaged and, e.g., cut up, to such an extent that subsequent utilization is adversely affected. Third, the time required for the processing of a field should be short and the associated fuel consumption should be kept as low as possible. Further quality criteria are conceivable. Depending on the overall situation, in particular on the particular basic economic conditions, different quality criteria are paramount, which criteria collectively form a harvesting-process strategy for carrying out the harvesting process.

In order for the aforementioned quality criteria to be met, the threshing unit must be controlled in a certain manner, wherein this manner depends not only on the special quality criteria, but also on different conditions of the environment, of the combine harvester and, in particular, of the threshing unit itself, and on the type and composition of the crop. The prioritization of one quality criterion is usually a disadvantage for another quality criterion.

From the prior art and, in particular, EP 1 731 017 B2, it is known to provide a special control process in a control device for optimizing the threshing unit, i.e., the threshing-unit optimization process. When this control process is activated, it sets "optimal" threshing-unit settings on the threshing unit and then shuts off. This threshing-unit optimization process always runs in the same manner and, in particular, using the same settings. The activation of the threshing-unit optimization process furthermore shuts off a regulation process, which may be running at the time, for the ground speed of the combine harvester, so that said combine harvester cannot run simultaneously.

Moreover, DE 10 2009 009 767 A1, discloses a combine harvester comprising a driver assistance system, which driver assistance system measures different variables (e.g., speed, concave width, grain losses) on the combine harvester and checks them to determine whether they pass into a critical value range or exceed or undershoot critical limit values. If this situation occurs, the driver assistance system interactively communicates with the driver by proposing, to the driver, measures to take during the control of the threshing unit that are intended for moving out of the critical value range. The driver can then accept or reject these proposals, wherein, in a subsequent step, alternative proposals may be made to the driver, or the driver can specify the proposed measures more precisely by an entry.

The disadvantage of such prior art is that the driver assistance system determines the aforementioned measures on the basis of a database having expert knowledge stored therein, which expert system is always associated with complex hardware and considerable administration effort.

SUMMARY OF THE INVENTION

The present invention overcomes the shortcomings of known arts, such as those mentioned above.

To that end, the present invention includes to a combine harvester with a threshing unit and a driver assistance system which controls the threshing unit, the driver assistance system including a memory for storing data, and a computing unit for processing the data stored in the memory. The invention provides a comprehensive and advantageous control of the threshing unit with minimal complication and with less effort required by the driver.

First, it is essential that a functional system model for at least one part of the combine harvester is stored in the memory of the driver assistance system, which system model forms the basis for the autonomous determination of the at least one threshing-unit parameter. The term "functional system model" means that at least a portion of the functional interrelationships within the combine harvester are depicted by the system model. Examples of this are provided further below.

In order to depict the functional interrelations by the system model, it is provided that at least one family of characteristics is assigned to at least one harvesting-process parameter, wherein the harvesting-process parameter is the output variable of the particular family of characteristics. By use of an aforementioned family of characteristics, the invention provides for depicting complex functional interrelations with little computing effort.

An aforementioned family of characteristics, in this case and preferably very generally, is the dependence of an output variable on at least one input variable, in particular on two or multiple input variables.

Preferably, the computing unit aligns the system model with the current harvesting-process state during on-going operation. The consideration here is that of aligning the system model forming the basis for the autonomous determination of the threshing-unit parameters with the actual conditions, in particular cyclically.

Preferably, the threshing-unit, together with the driver assistance system, forms an automated threshing unit. This means that the driver assistance system, with its memory for storing data and with its computing unit, is designed to autonomously determine individual machine parameters of the threshing unit and to assign them to the threshing unit. Such machine parameters are referred to here as "threshing-unit parameters". The basis for the determination of the threshing-unit parameters is a selection, made by the user, of harvesting process strategies, which are stored in the memory of the driver assistance system. As a result, a manner of controlling the threshing unit can be specified by a single selection of the active harvesting-process strategy. Another entry by the driver is not required in order for the threshing-unit parameters to be determined, in the narrower sense. The driver has the possibility, however, of changing the selected harvesting-process strategy if so desired, so that autonomous control subsequently continues, although possibly with a different prioritization.

Preferably, a cyclic determination of threshing-unit parameters during the harvesting operation is provided. The term "cyclical" is intended to be interpreted broadly and, in the present case, refers to a continuous determination having a cycle time that is constant but also varies. Such a cyclic determination of the at least one threshing-unit parameter results in a good reaction time of the combine harvester to changes in the harvesting-process state. Therefore, it is advantageous in this context to also align the system model with the current harvesting-process state in a cyclic manner. The cycle times must be set so as to be short enough that an aforementioned, advantageous reaction time can be achieved.

Preferably, the computing unit aligns the system model with the particular current harvesting-process state using a recursive method, so that the system model incrementally approaches the actual conditions.

The harvesting-process state refers to all state variables that are related to the harvesting process in any manner. These include field information and/or harvesting-process parameters and/or threshing-unit parameters and/or environmental information.

In an embodiment, a sensor system for detecting at least a portion of the harvesting-process state is provided. This makes it possible, in particular, to implement the aforementioned cyclic alignment of the system model in a particularly simple manner. In other preferred embodiments, at least a portion of the harvesting-process state can be entered via an input/out device. This makes it possible to verify sensor information or determine state variables that are difficult to ascertain using sensors.

Preferably, at least one initial model is stored in the memory of the driver assistance system, which model can function as a starting value for the aforementioned, continuous alignment of the system model. Given a suitable selection of the initial model, the system model is brought into good conformance with the actual conditions in only a few alignment cycles.

In an embodiment, a highly particular structuring of the at least one family of characteristics is provided, which structuring accounts for the fact that the threshing-unit parameters "drum speed" and "concave width" are particularly significant for the implementation of the aforementioned harvesting-process strategies.

In another embodiment, the computing unit aligns the at least one family of characteristics with the actual harvesting-process state during the on-going harvesting operation, preferably cyclically. For the implementation of such an alignment, it is preferably provided that multiple points within the family of characteristics are measured again using a sensor system. A deviation of the measured points from the associated points of the system model results in a corresponding alignment of the at least one family of characteristics.

For the implementation of the particular selected harvesting-process strategy on the basis of the system model, in one form the invention stores at least one implementation instruction in the memory. One example of such an implementation instruction is the determination of the at least one threshing-unit parameter in a pure control process. In the simplest case, the computing unit functions to determine the at least one threshing-unit parameter as a characteristic control on the basis of the aforementioned at least one family of characteristics. In the course of the determination of the at least one threshing-unit parameter, it is possible to omit complex regulating processes with associated regulation-related feedback.

In an embodiment, a further implementation instruction that is preferably used consists of utilizing a multi-objective optimization for the simultaneous implementation of mutually conflicting harvesting-process strategies. A preferred implementation instruction consists of defining premises, on the basis of which the computing unit carries out a prioritization between different aspects. Within the scope of the multi-objective optimization, in particular, the definition of premises makes it possible to effectively determine threshing-unit parameters.

BRIEF DESCRIPTION OF THE DRAWINGS

Further details, features, objectives, and advantages of the present invention are explained in greater detail in the following on the basis of the drawing of a preferred exemplary embodiment. In the drawings.

DETAILED DESCRIPTION OF THE PREFERRED EMBODIMENTS

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

A combine harvester according to the invention comprises a threshing unit 1 for threshing picked-up crop to obtain grain. Crop as used herein is intended to mean the entirety of material that is picked up from the field and fed to the threshing unit 1, wherein grain refers to the kernels to be obtained from the crop by the combine harvester. As is apparent from FIG. 1, a field is mowed by a header 2 of the combine harvester and the crop obtained as a result is fed by a slope conveyor 3 to the threshing unit 1.

Figure 1:
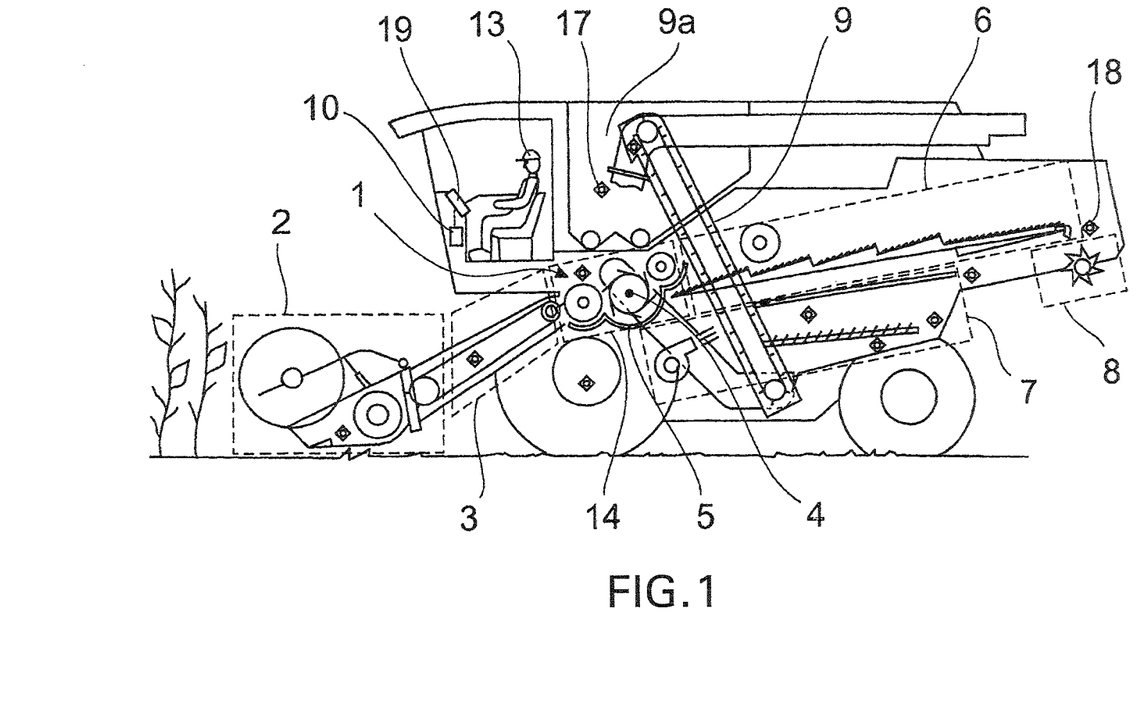
FIG. 1 presents a side view of a combine harvester according to the invention.

The threshing unit 1 is equipped with a threshing drum 4, which interacts with a threshing concave 5. A separation system 6 is disposed downstream of the threshing unit 1 in terms of processing. The crop stream fed to the threshing unit 1 is therefore subsequently fed, without the grain already obtained here, to the separation system 6.

The threshing unit 1 is used to rub the preponderant portion of the grain out of the straw of the crop by the threshing process. In the separation system 6, the crop is then moved, e.g., shaken, along with the grain portion remaining therein, in such a way that the remaining grain is also preferably separated from the straw and the rest of the crop. The grain obtained in the threshing unit 1 and in the separation system 6 is then fed to a cleaning system 7. In the cleaning system 7, which usually has multiple stages, material other than grain, e.g., chaff and straw parts, which has been carried along in the grain up to this point, as well as non-threshed material, such as, e.g., ear tips or awns, are separated from the grain. The cleaned grain then passes via a transport system 9, e.g., a grain elevator, into a grain tank 9a. The threshed straw, i.e., the crop remaining in the separation system 6, is deposited by the combine harvester, e.g., as swath, along the wheel track.

The threshing unit 1 is controlled via the specification of different machine parameters. Depending on the design of the combine harvester 1, the machine parameters include, for example, a drum speed 1a or any other motional characteristic values of the threshing drum 4 and a concave width 1b, i.e., the spacing between the threshing drum 4 and a threshing concave 5. Provided the threshing unit 1 comprises filler plates, these can also be adjusted within the scope of the control of the threshing unit 1.

Figure 2:
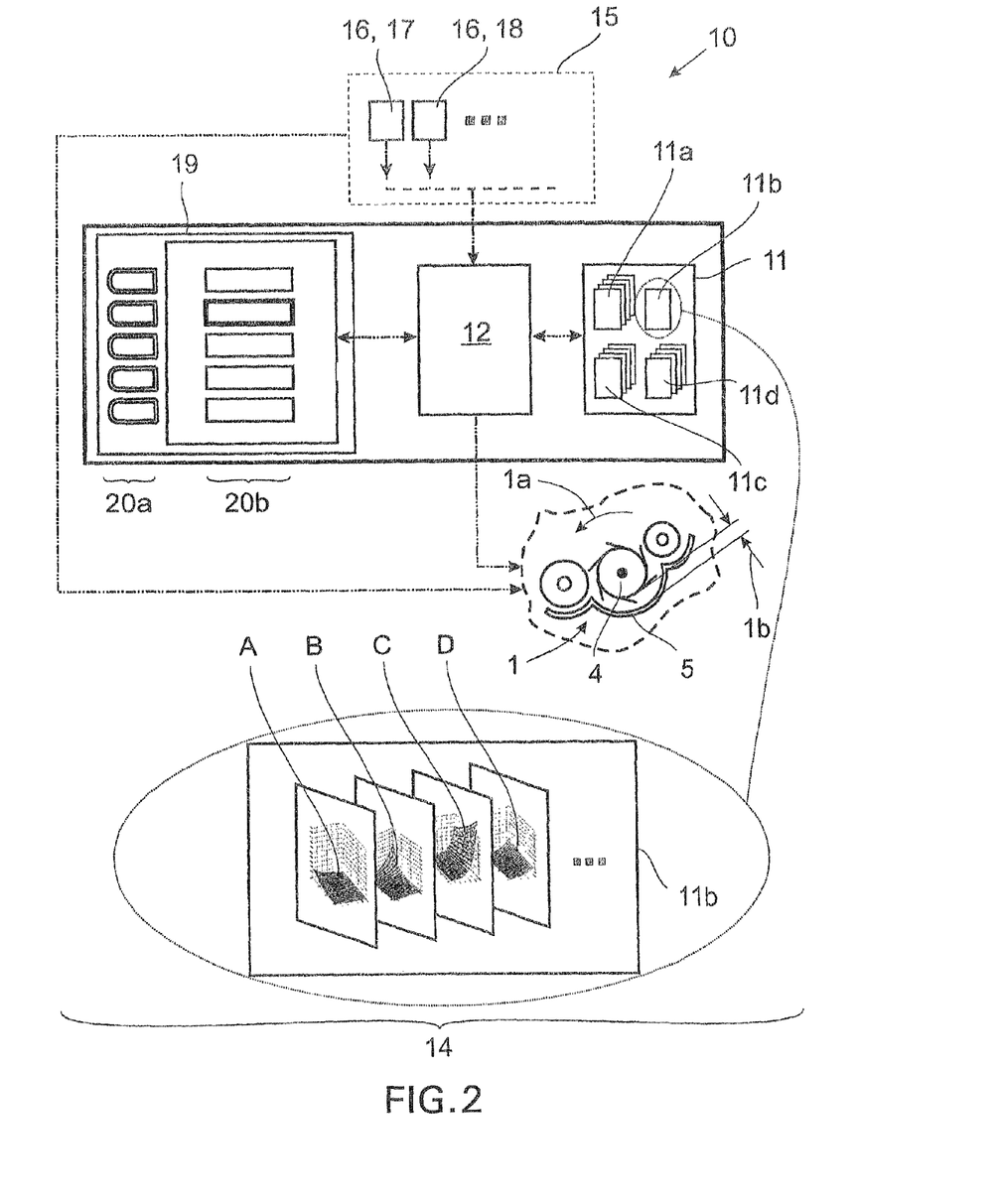
FIG. 2 presents a schematic depiction of a driver assistance system of a combine harvester according to the invention.

The combine harvester according to the invention further comprises a driver assistance system 10 for controlling the threshing unit 1. This driver assistance system 10 comprises a memory 11 for storing data, i.e., a memory in the sense of information technology, and a computing unit 12 for processing the data stored in the memory 11. The driver assistance system is designed to support a driver 13 of the combine harvester during the operation of the combine harvester. The driver assistance system 10 comprising the memory 11 and the computing unit 12 is schematically shown in FIG. 2.

The threshing unit 1, together with the driver assistance system 10, preferably forms an automated threshing unit 14. Such automated threshing unit is preferably realized according to the invention in that a plurality of selectable harvesting-process strategies 11a is stored in the memory 11 and, in order to implement the selected harvesting-process strategy 11a or the harvesting-process strategies 11a, the computing unit 12 is designed to autonomously, in particular, determine at least one machine parameter for the threshing unit 1 and specify said machine parameter to the threshing unit 1. Such machine parameters for the threshing unit 1 are referred to here as "threshing-unit parameters". In this manner, an automated threshing unit 14 is provided, which comprehensively regulates all variables that are relevant for the work of the threshing unit 1, such that said variables are coordinated with one another. The situation is therefore avoided, in particular, in which there are conflicting controls which come from different directions and could possibly cancel each other out. Instead, the control of all relevant parameters is carried out "under one roof". In addition, the driver 13 can specify a desired qualitative result and does not need to have his own expert knowledge of the details required for this result.

The determination of the threshing-unit parameters is an autonomous determination to the extent that the harvesting-process strategy 11a is implemented by the computing unit 12 without the need for intervention by the driver 13 or for a query to the driver 13 during the determination of the threshing-unit parameters 1a, 1b in the narrower sense. Such an intervention by the driver 13 is therefore still possible, in principle, but is not necessary. In this case, the stored harvesting-process strategies 11a differ in terms of the objective of setting or optimizing harvesting-process parameters, which will be explained further below.

It should be noted that the driver assistance system 10 is centrally designed. The driver assistance system is used to control not only the threshing unit 1, but also working units installed upstream and downstream, such as the header 2, the slope conveyor 3, the separation system 6, the cleaning system 7 and the spreader system 8. It also is conceivable that the driver assistance system 10 is decentrally structured and composed of a number of individual control systems. As such, for example, that at least a portion of the working units of the combine harvester each have an assigned, decentral control system.

A functional system model 11b for at least one part of the combine harvester is stored in the memory 11 of the driver assistance system 10, wherein the computing unit 12 carries out the aforementioned, autonomous determination of the at least one threshing-unit parameter 1a, 1b based on the system model 11b.

The functional system model 11b is a computational model for depicting functional interrelations within the combine harvester. Examples of such functional interrelations are explained further below.

The system model 11b is aligned with the current harvesting-process state by the computing unit 12, preferably during the on-going harvesting operation. This means that the computing unit 12 checks to determine whether the functional interrelations depicted in the system model 11b match the actual harvesting-process state. If this check reveals deviations, the computing unit 12 implements an appropriate change in the system model 11b. In a particularly preferred embodiment, this alignment takes place cyclically, wherein reference is made to the general part of the description with respect to the broad interpretation of the term "cyclically".

In an embodiment, the computing unit 12 aligns the system model 11b, in a recursive method, with the actual harvesting-process state and stores the system model 11b in the memory 11. This is accomplished in that the system model 11b stored in the memory 11 before the alignment is taken into account in the alignment. Therefore, an incremental alignment of the system model 11b is provided.

In the sense of short reaction times of the combine harvester to changing harvesting-process states, the invention provides that the computing unit 12 determines the threshing-unit parameters cyclically, in the sense described above. Reference is made to the broad interpretation of the term "cyclically" in this context as well.

As mentioned, the term "harvesting-process state" includes all information related to the harvesting process. This includes field information such as "crop density", "threshability of the crop" and "crop moisture." This further includes the harvesting-process parameter "threshing losses" as a measure of the non-threshed kernels deposited onto the field, the harvesting-process parameter "broken grain portions" as a measure of the broken kernels deposited in the grain tank, the harvesting-process parameter "material feed height" as a measure of the throughout, the harvesting-process parameter "separation losses" as a measure of the kernels deposited on the field by the separation system 6, the harvesting-process parameter "cleaning losses" as a measure of the kernels deposited on the field by the cleaning system 7, the harvesting-process parameter "slip threshing-unit drive" as a measure of the threshing-unit load and the harvesting-process parameter "fuel consumption" as a measure of the energy consumption of the threshing-unit drive. The field information also includes threshing-unit parameters such as "drum speed" and "concave width", and environmental information such as "ambient temperature" and "ambient moisture". All this information to be incorporated into the computation of the harvesting-process state can be determined in different ways.

With regard to the term "material feed height", please note that this term should be broadly interpreted and includes both the material feed height of the crop stream picked up by the threshing unit, in the narrower sense, as well as the throughput of the crop stream passing through the threshing unit 1. In this regard, all the interpretations of the material feed height apply equally to the throughput. In particular, the term "material feed height" can be replaced by the term "throughput" in the present case.

In an embodiment, a sensor system 15 for detecting at least a portion of the harvesting-process state is provided.

The sensor system 15 has multiple sensors 16. For example, the sensor system 15 comprises a grain sensor 17 for detecting a piece of grain information. As shown in FIG. 1, the grain sensor 17 can be designed as a grain camera system. The grain sensor 17 can detect an aforementioned broken grain portion, a portion of material other than grain, an awn-grain portion and/or an ear-tip portion. To this end, the potentially multipart grain sensor 17 can detect the piece of grain information in the grain tank 9a and/or in the transport system 9 of the combine harvester.

Alternatively or additionally, the sensor system 15 of FIG. 1 may comprise a swath sensor 18 for ascertaining a piece of swath information. A swath sensor 18, when suitably designed, is used to detect a grain portion in the swath. Such a grain portion therefore represents a loss of grain.

Alternatively to the detection of the harvesting-process state by use of a sensor system 15, it is provided that an input/out device 19 is assigned to the driver assistance system 10, wherein at least a portion of the harvesting-process state is entered via the input/output device 19. In this case, the computing unit 12 generates queries related to the current harvesting-process state and outputs the queries via the input/output device 19. In response to such a query, the driver 13 inputs at least a portion of the harvesting-process state via the input/output device. The input/output device 19 comprises suitable input elements 20a and output elements 20b for this purpose.

An aforementioned query preferably consists of whether the threshability of the field is: "can be easily threshed", "can be threshed as normal" or "is difficult to thresh". In the simplest case, the driver 13 is provided with a selection of predetermined answers.

As described above, the system model 11b is aligned, preferably cyclically, with the actual harvesting-process state. At least one initial model 11c is stored in the memory 11, as the starting value for the system model 11b, wherein, in the first determination of the at least one threshing-unit parameter, the computing unit 12 carries out the determination on the basis of the initial model 11c. The wording "first determination" refers to the situation, in particular, at the beginning of the harvesting operation, in which an alignment of the system model 11b has not yet been carried out.

In an embodiment, at least two initial models 11c are stored in the memory 11, wherein the computing unit 12 selects an initial model 11c depending on the particular harvesting-process state, on which the initial model the subsequent determination of the threshing-unit parameters is based.

The harvesting-process strategies 11a under discussion, which can be selected by the driver 13, are each directed toward different objectives. In a first variant, at least one harvesting-process strategy 11a is directed to the objective of setting or optimizing at least one harvesting-process parameter such as "threshing losses", "broken grain portion", "separation losses", "cleaning losses", "threshing-unit load", "fuel consumption" or the like. The implementation of the harvesting-process strategies 11a should take place in each case by use of a corresponding specification of threshing-unit parameters, in this case and preferably the threshing-unit parameters "drum speed" and "concave width", which are paramount for the control of the threshing unit 1.

The system model 11b preferably depicts at least a portion of the functional interrelationships between a harvesting-process parameter and at least one further parameter, in this case and preferably at least one threshing-unit parameter such as "drum speed" and "concave width" and/or at least one further harvesting-process parameter such as "material feed height".

For the depiction of the functional interrelationships, at least one family of characteristics A-J is assigned to a harvesting-process parameter, wherein, in this case, this harvesting-process parameter is defined as an output variable of the at least one family of characteristics A-J.

In an embodiment and as depicted in FIGS. 3A, 3B, 4A, 4B, 5A, 5B, 6A, 6B, 7A and 7B, the harvesting-process parameter "material feed height" and one threshing-unit parameter, preferably the threshing-unit parameter "drum speed" or the threshing-unit parameter "concave width", are defined as input variables for the at least one family of characteristics A-J.

In order to depict the functional interrelations between one harvesting-process parameter as the output variable and different input variables, a first family of characteristics and a second family of characteristics are assigned to this harvesting-process parameter. In this case, the input variables for the first family of characteristics A, C, E, G, I are the further harvesting-process parameter "material feed height" and the threshing-unit parameter "drum speed" are depicted in FIGS. 3A, 4A, 5A, 6A and 7A), while the further harvesting-process parameter "material feed height" and the threshing-unit parameter "concave width" form the input variables for the second family of characteristics B, D, F, H, J are depicted in FIGS. 3B, 4B, 5B, 6B and 7B).

Figure 3A:
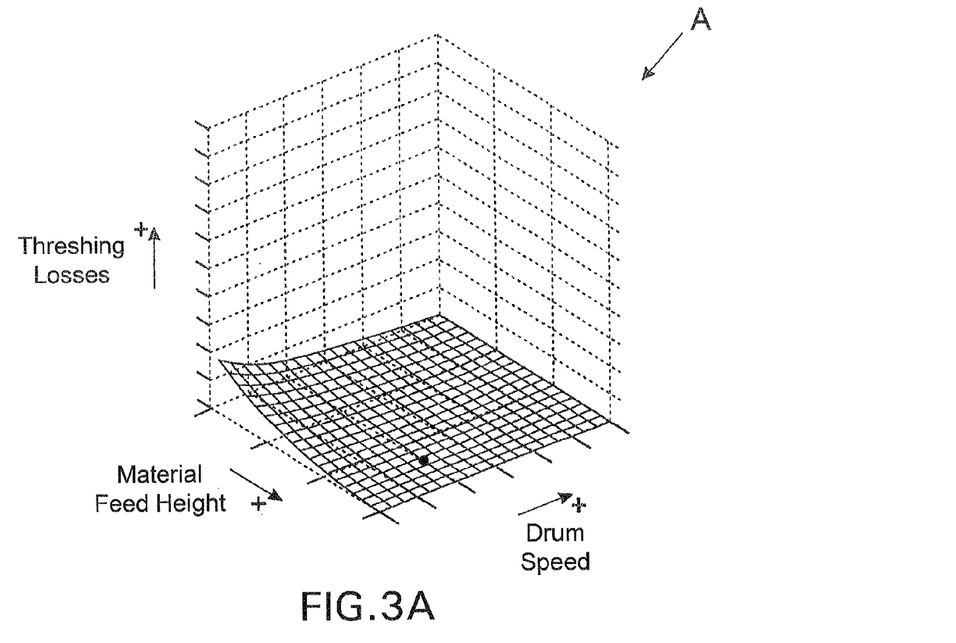
FIG. 3A presents a family of characteristics A for the functional interrelation between the output variable "threshing losses" and the input variables "material feed height" and "drum speed"

FIG. 3A shows the family of characteristics A for the functional interrelation between the output variable "threshing losses" and the input variables "material feed height" and "drum speed." As indicated, threshing is that much better the higher the input variable "material feed height", which represents the throughput, and the higher the threshing drum speed are.

Figure 3B:
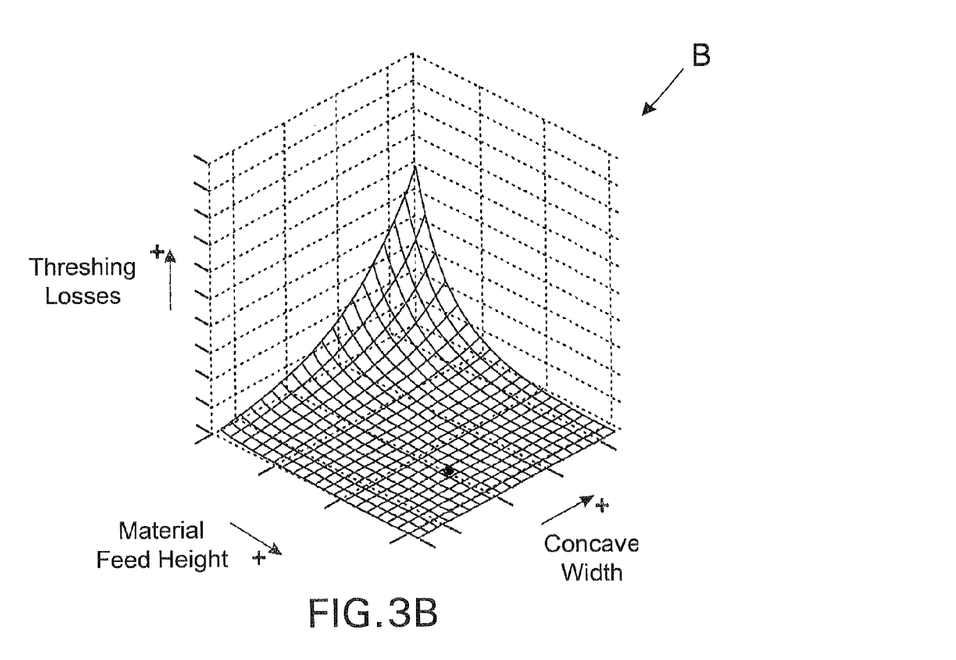
FIG. 3B presents a family of characteristics B for the functional interrelation between the output variable "threshing losses" and the input variables "material feed height" and "concave width"

FIG. 3B shows the family of characteristics B for the functional interrelation between the output variable "threshing losses" and the input variables "material feed height" and "concave width." As indicated, threshing is that much better the higher the material feed height, which represents the throughput, and the smaller the concave width are.

Figure 4A:
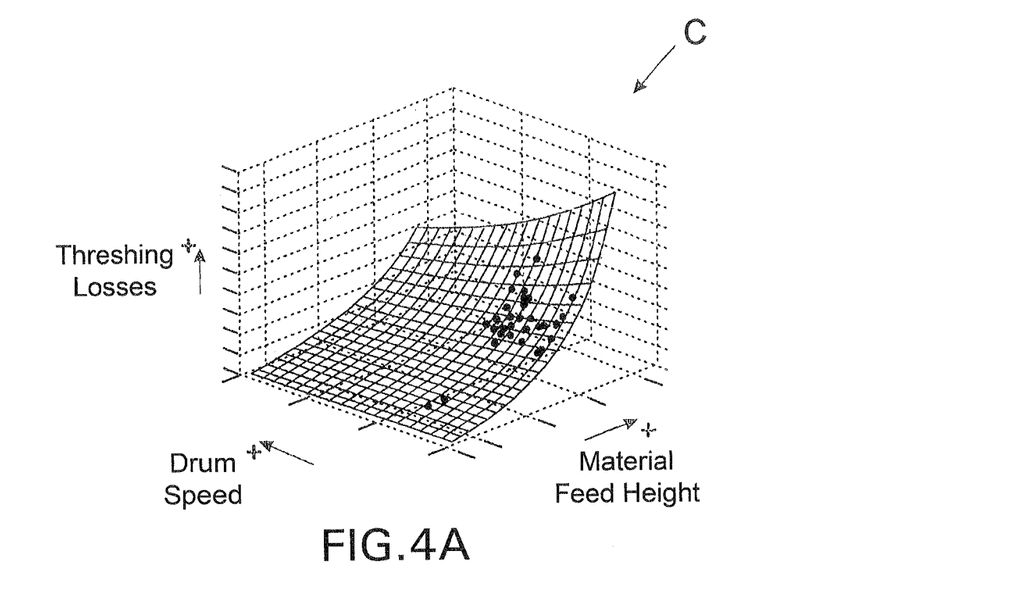
FIG. 4A presents a family of characteristics C for the functional interrelation between the output variable "threshing losses" and the input variables "material feed height" and "drum speed"

FIG. 4A shows the family of characteristics C for the functional interrelation between the output variable "threshing losses" and the input variables "material feed height" and "drum speed." As indicated, as the material feed height increases and the threshing drum speed decreases, the separation losses increase or the separation decreases.

Figure 4B:
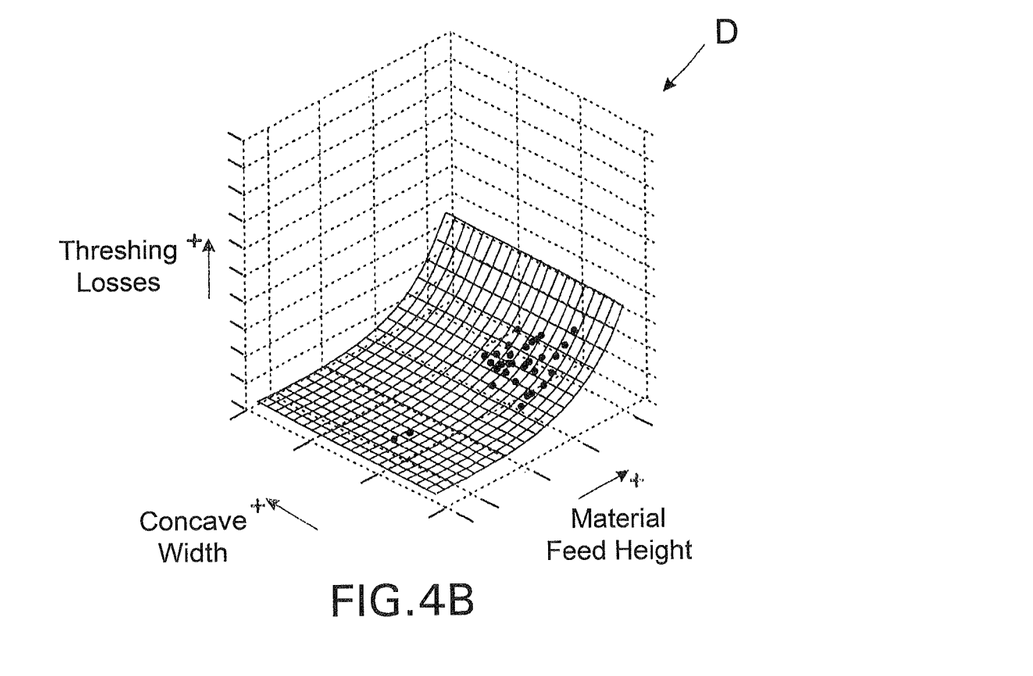
FIG. 4B presents a family of characteristics D for the functional interrelation between the output variable "threshing losses" and the input variables "material feed height" and "concave width"

FIG. 4B shows the family of characteristics D for the functional interrelation between the output variable "threshing losses" and the input variables "material feed height" and "concave width." As indicated, as the material feed height, which represents the throughput, increases and the concave width increases, the separation losses increase.

Figure 5A:
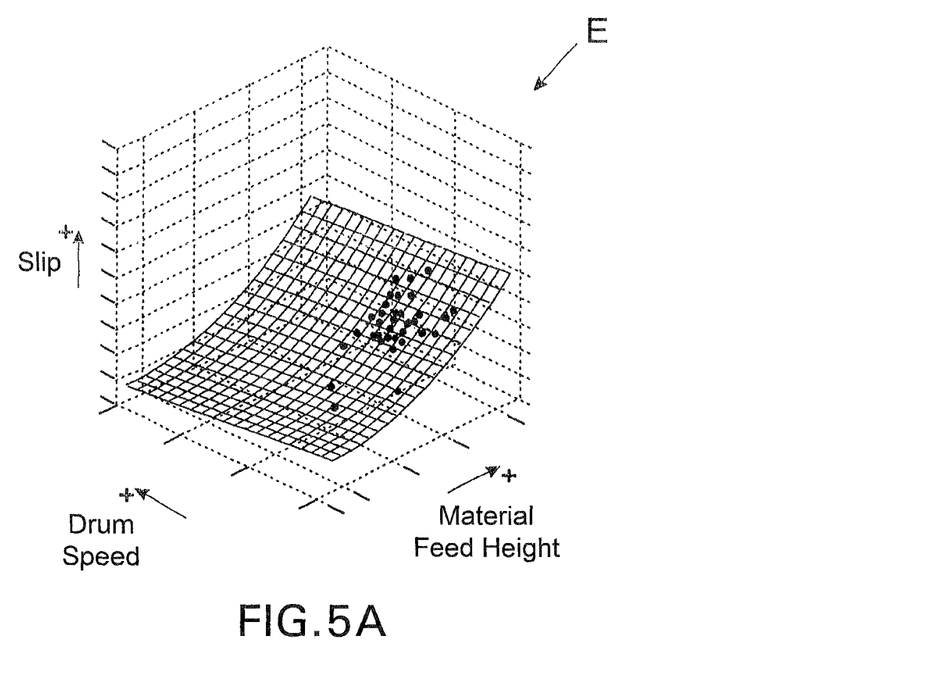
FIG. 5A presents a family of characteristics E for the functional interrelation between the output variable "slip threshing-unit drive", which represents the threshing-unit load, and the input variables "material feed height" and "drum speed"

FIG. 5A shows the family of characteristics E for the functional interrelation between the output variable "slip threshing-unit drive", which represents the threshing-unit load, and the input variables "material feed height" and "drum speed." As indicated, as the material feed height, which represents the throughput, increases and the drum speed decreases, the load on the threshing unit, which is the slip in the drive train of the threshing unit in this case, decreases.

Figure 5B:
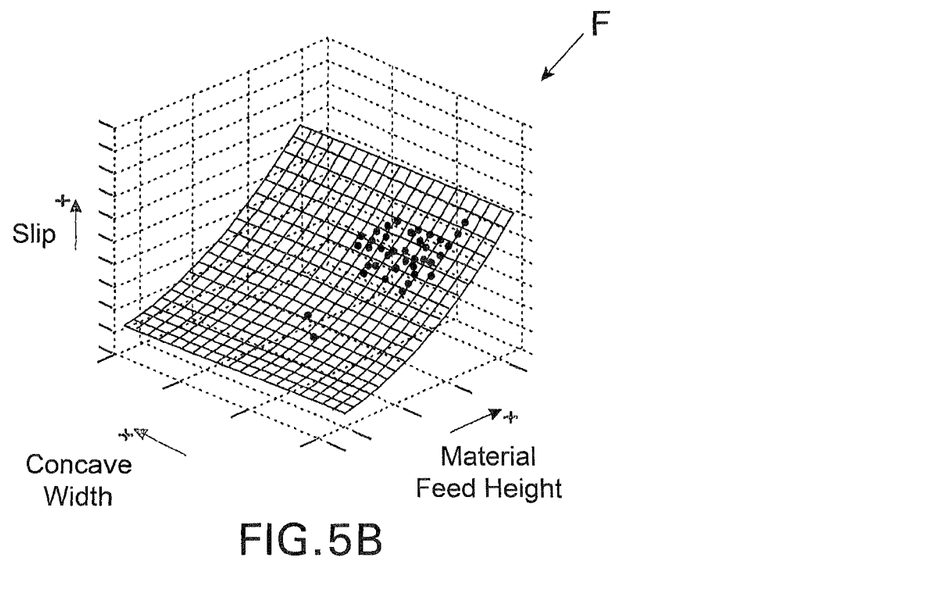
FIG. 5B presents a family of characteristics F for the functional interrelation between the output variable "slip threshing-unit drive" and the input variables "material feed height" and "concave width"

FIG. 5B shows the family of characteristics F for the functional interrelation between the output variable "slip threshing-unit drive" and the input variables "material feed height" and "concave width." As indicated, as the material feed height increases and the concave width decreases, the slip in the threshing-unit drive increases.

Figure 6A:
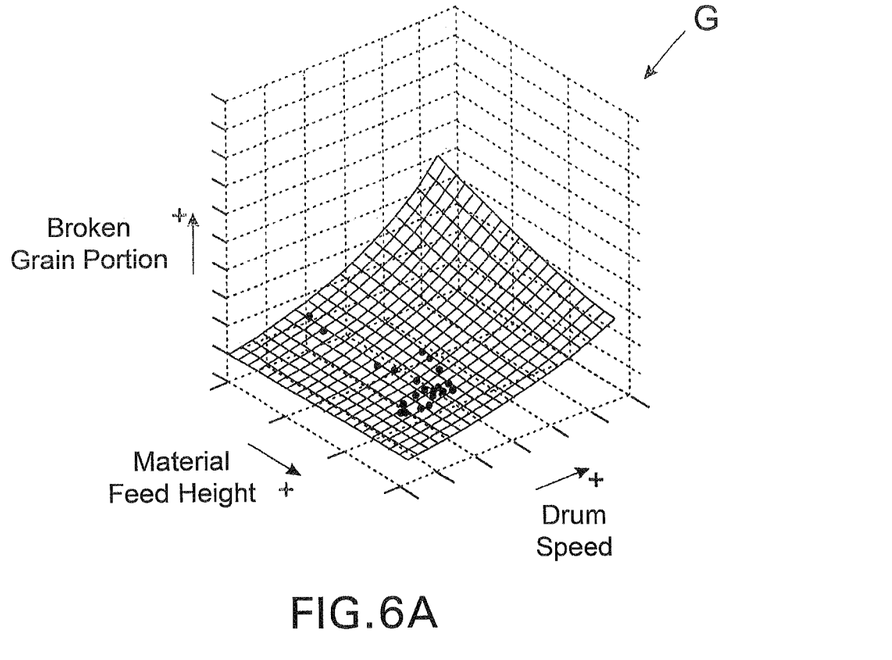
FIG. 6A presents a family of characteristics G for the functional interrelation between the output variable "broken grain portion" and the input variables "material feed height" and "drum speed"

FIG. 6A shows the family of characteristics G for the functional interrelation between the output variable "broken grain portion" and the input variables "material feed height" and "drum speed." As indicated, as the drum speed $1a$ increases and the material feed height decreases, the broken grain portion increases.

Figure 6B:
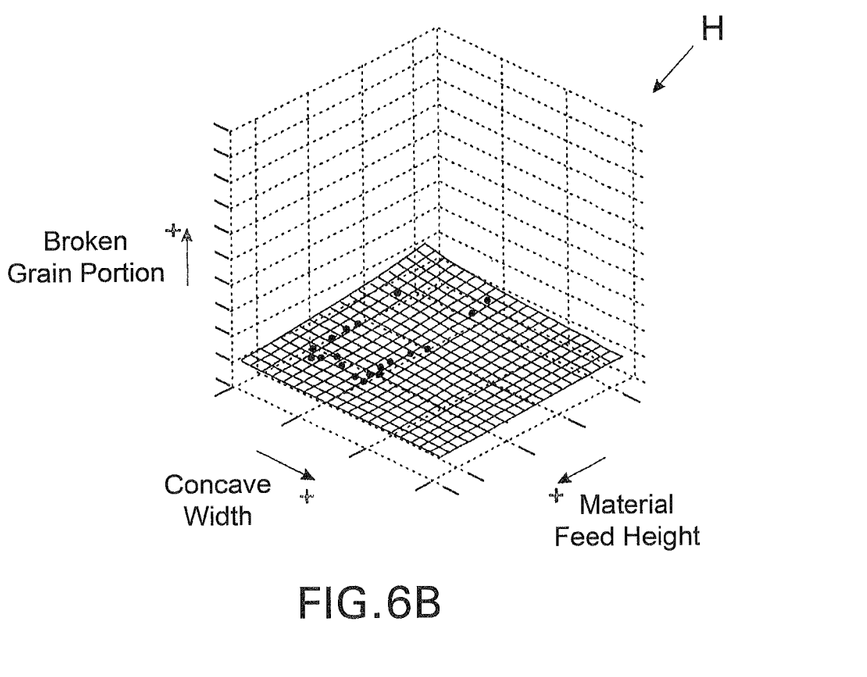
FIG. 6B presents a family of characteristics H for the functional interrelation between the output variable "broken grain portion" and the input variables "material feed height" and "concave width"

FIG. 6B shows the family of characteristics H for the functional interrelation between the output variable "broken grain portion" and the input variables "material feed height" and "concave width." As indicated, as the material feed height, which represents the throughput, decreases and the concave width decreases, the broken grain portion increases.

Figure 7A:
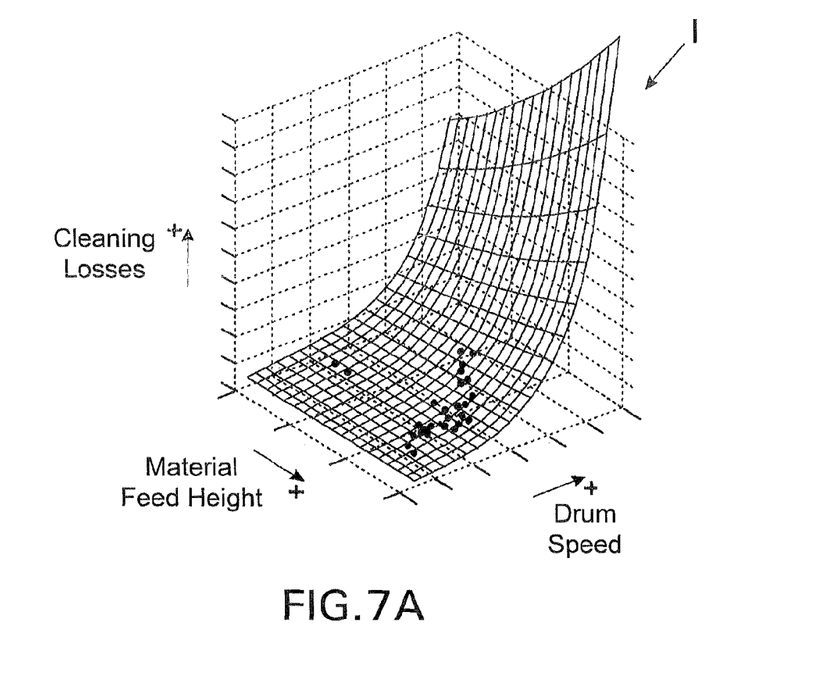
FIG. 7A presents a family of characteristics I for the functional interrelation between the output variable "cleaning losses" and the input variables "material feed height" and "drum speed"

FIG. 7A shows the family of characteristics I for the functional interrelation between the output variable "cleaning losses" and the input variables "material feed height" and "drum speed." As indicated, as the drum speed $1a$ increases and the material feed height, which represents the throughput, increases, the cleaning losses increase.

Figure 7B:
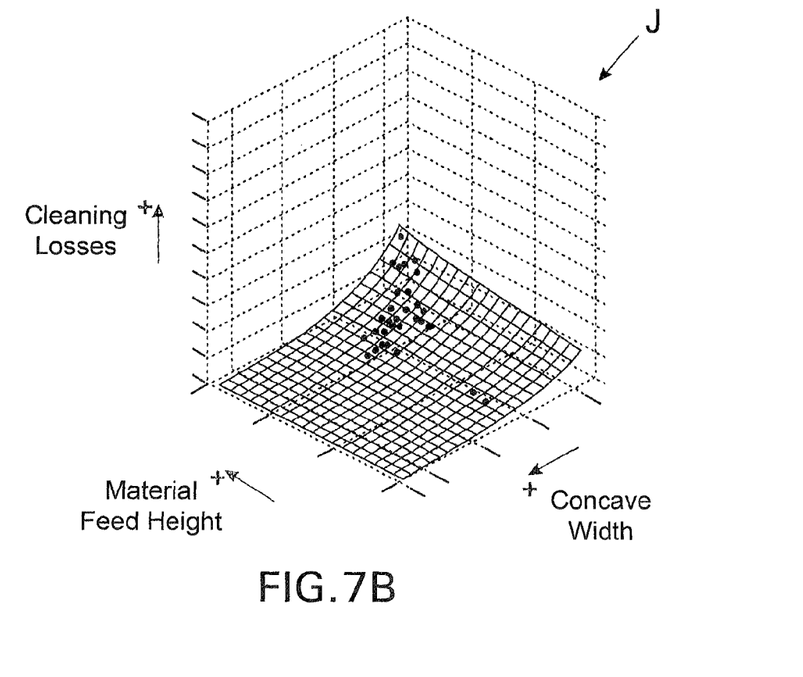
FIG. 7B presents a family of characteristics J for the functional interrelation between the output variable "cleaning losses" and the input variables "material feed height" and "concave width."

FIG. 7B shows the family of characteristics J for the functional interrelation between the output variable "cleaning losses" and the input variables "material feed height" and "concave width." As indicated, as the concave width $1b$ decreases and the material feed height, which represents the throughput, increases, the cleaning losses increase.

With respect to the depictions of the families of characteristics A-J in FIGS. 3A, 3B, . . . 7A, 7B, it should be noted that the scales of the output variables are identical in the depictions A and B. As indicated, a setting of the output variable can be made primarily via the drum speed $1a$ or primarily via the concave width $1b$, depending on the particular input variable. As further indicated in the depictions of the families of characteristics A-J in FIGS. 3A, 3B, . . . 7A, 7B, various strategies for setting or optimizing output variables can conflict with one another. This is significant, in particular, for the implementation instructions described further below.

In one embodiment, the computing unit 12 always uses one and the same family of characteristics A-J, possibly with a modification based on the aforementioned alignment, as the basis for the determination of the at least one harvesting-process parameter. Preferably, the computing unit 12 selects at least one family of characteristics A-J depending on the current harvesting-process state and uses this as the basis for the determination of the at least one threshing-unit parameter. It is therefore possible to react to a change in harvesting-process states, for example, to a change in crop moisture, or the like, for example, by way of a suitable selection of the family of characteristics A-J.

The above-described alignment of the system model $11b$ with the current harvesting-process state is preferably carried out, in the case of the system model $11b$ having at least one family of characteristics A-J, in that the computing unit 12 aligns the at least one family of characteristics A-J with the harvesting-process state during the on-going harvesting operation, in particular, cyclically. On the basis of the initial model $11c$, value, wherein, in the first determination of the at least one threshing-unit parameter, the computing unit 12 therefore carries out the determination of the at least one threshing-unit parameter on the basis of the initial family of characteristics. A series of real sensor measured values is plotted for the particular harvesting-process state in each of the FIGS. $3a$, 3B, . . . 7A, 7B. In the aforementioned alignment, the computing unit 12 implements a change in the particular family of characteristics A-J in order to move the family of characteristics A-J closer to the real sensor measured values. For example, the entire family of characteristics A-J can be shifted in the direction of the particular output variable, which is upward or downward in FIGS. 3a, 3B, . . . 7A, 7B. It is particularly advantageous, however, when the shift of the family of characteristics A-J is achieved in such a way that it also induces a change in the curves of the particular characteristics.

In this case and preferably, at least one selectable harvesting-process strategy 11a comprises at least two sub-strategies, each of which is directed to the setting or optimization of a harvesting-process parameter. In this sense, a harvesting-process strategy "balance" can be provided, which comprises two weighted, in particular balanced, sub-strategies, in particular the sub-strategies of the setting or optimization of the harvesting-process parameters "separation losses" and "threshing losses".

At least one implementation instruction 11d is stored in the memory 11 for the implementation of the particular harvesting-process strategy 11a by the computing unit 12. Various advantageous variants are conceivable for the implementation instruction 11d. In a first variant, an implementation instruction 11d implements the determination of the at least one threshing-unit parameter in a control process and not in a regulating process. In this case, the computing unit 12 functions to determine the at least one threshing-unit parameter, preferably as a characteristic control. Regulation-related feedback is therefore not provided in the determination of the threshing-unit parameters. The reaction of the computing unit 12 to changes in the harvesting-process state results solely from the aforementioned alignment of the system model 11b with the particular current harvesting-process state. This basis principle of the control of the threshing unit 1 results in a simplification of the determination of the threshing-unit parameters by eliminating the regulation-related feedback. As a result, it is possible to implement complex functional interrelationships, in particular the conflicting strategies to be explained in the following, with minor computing effort and relatively quickly.

Conflicting strategies can result, for example, when at least one selectable harvesting-process strategy 11a comprises at least two aforementioned sub-strategies, which conflict with one another with respect to one and the same threshing-unit parameter. A second possibility in this context is that at least two selectable harvesting-process strategies as such conflict with one another with respect to one and the same threshing-unit parameter. For example, according to FIG. 3A, the harvesting-process strategy of optimizing the threshing losses regularly requires that the drum speed be increased, while, according to FIG. 6B, the harvesting-process strategy of optimizing the broken grain portion requires that the drum speed be reduced. In this case, it is assumed that the optimization always relates to the greatest reduction in the threshing losses and the broken grain portion.

In the aforementioned situations, an implementation instruction 11d for implementing the mutually conflicting strategies preferably includes a multi-objective optimization, which can be a Pareto optimization, for example. Such a multi-objective optimization can be implemented particularly easily on the basis of the system model 11b, preferably on the basis of the aforementioned families of characteristics A-J and, further preferably, using the aforementioned characteristic control.

In particular, in the implementation of the mutually conflicting strategies, it is preferably provided that an implementation instruction 11d includes at least one premise, on the basis of which the computing unit 12, in the autonomous determination of the at least one threshing-unit parameter, implements a prioritization between selected harvesting-process strategies 11a and/or between sub-strategies of a selected harvesting-process strategy 11a and/or between harvesting-process parameters to be set or optimized, and/or between threshing-unit parameters to be specified.

In this case, a preferred premise, for example, is that the computing unit 12 always implements the setting or optimization of the broken grain portion before the setting or optimization of the threshing losses. Alternatively or additionally, a preferred premise, for example, is that the specification of the concave width 1b is preferred over the specification of the drum speed 1a for the setting or optimization of the threshing losses. A further premise can be, preferably, that the specification of the drum speed 1a is preferred over the specification of the concave width 1b for the setting or optimization of the broken grain portion.

Moreover, further implementation instructions 11d are conceivable, which are directed to certain individual cases, which are particularly significant in practical applications. For example, an implementation instruction for the harvesting-process strategy 11a for the setting or optimization of the harvesting-process parameter "threshing losses" consists of the computing unit 12 specifying an increase in the drum speed 1a and/or a reduction in the concave width 1b in response to a reduction of the material feed height in the threshing unit 1, on the basis of the system model 11b.

It also is conceivable in this context that an implementation instruction 11d for the harvesting-process strategy 11a for the setting or optimization of the harvesting-process parameter "separation losses" consists of the computing unit 12 specifying, on the basis of the system model 11b, an increase in the drum speed 1a in response to an increase in the material feed height in the threshing unit 1.

The system model 11b, on the one hand, and the implementation instructions 11d, on the other hand, are preferably designed in such a way that the computing unit 12 autonomously sets the threshing-unit parameters "drum speed" and "concave width" in the upper third of their respective setting ranges in order to implement the harvesting-process strategy "balance" between the sub-strategies of the optimization of the harvesting-process parameter "separation losses" and the optimization of the harvesting-process parameter "threshing losses".

In addition, a method of the combine harvester preferably results such that the computing unit 12 autonomously sets the threshing-unit parameter "drum speed" in the middle third and sets the harvesting-process parameter "concave width" in the upper third of their respective setting ranges in order to implement the harvesting-process strategy comprising the sub-strategy of the setting or optimization of the harvesting-process parameter "slip threshing-unit drive" and the sub-strategy of the setting and the optimization of the harvesting-process parameter "broken grain portion."

LIST OF REFERENCE NUMBERS 1 threshing unit
1a drum speed
1b concave width 1b
2 header
3 slope conveyor
4 threshing drum
5 threshing concave
6 separation device
7 cleaning device
8 spreader system 9 transport system
9a grain tank
10 driver assistance system
11 memory
11a harvesting-process strategy
11b system model
11c initial model
11d implementation instruction
12 computing unit
13 driver
14 automated threshing unit
17 grain sensor
18 swath sensor
19 input/output device
20a input elements
20b output elements
A-J families of characteristics As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. A combine harvester including an automated threshing unit, the automated threshing unit comprising:
   a threshing unit for threshing picked-up crop to obtain grain;
   a driver assistance system for controlling the threshing unit, the driver assistance system comprising a memory for storing data and a computing unit for processing the data stored in the memory;
   wherein a functional system model that depicts at least a portion of functional interrelationships for at least one part of the combine harvester, and a plurality of selectable harvesting-process strategies, are stored in the memory;
   wherein the computing unit autonomously determines at least one threshing unit parameter on a basis of the functional system model,
   wherein at least one family of characteristics (A-J) is assigned to each harvesting-process parameter, of a plurality of harvesting-process parameters, to depict the functional interrelationships;
   wherein the each harvesting-process parameter is defined as an output variable of the at least one family of characteristics (A-J),
   wherein the computing unit specifies the at least one autonomously determined threshing unit parameter to the threshing unit to thereby select and implement one of the selectable harvesting-process strategies; and
   wherein the driver assistance system controls the threshing unit according to the implemented one of the selectable harvesting-process strategies.

2. The combine harvester according to claim 1, wherein a harvesting-process state includes field information selected from the group consisting of: crop density, threshability, crop moisture and one or more of the harvesting-process parameters.

3. The combine harvester according to claim 2, wherein the one or more of the harvesting-process parameters are selected from the group consisting of: threshing losses, broken grain portion, material field height, separation losses, cleaning losses, threshing-unit load, fuel consumption and threshing-unit parameters.

4. The combine harvester according to claim 3, wherein the at least one threshing-unit parameter selected from the group consisting of: drum speed, concave width and environment information.

5. The combine harvester according to claim 4, wherein the environment information includes ambient temperature, ambient humidity or both.

6. The combine harvester according to claim 4, wherein the at least one family of characteristics (A-J) is assigned to the harvesting-process parameter threshing losses based on a qualitative functional interrelationship that an efficiency of threshing increases as the input variable material feed height, which represents a throughput, and the threshing-unit drum speed, increase.

7. The combine harvester according to claim 4, wherein the at least one family of characteristics (A-J) is assigned to the harvesting-process parameter threshing losses based on a qualitative functional interrelationship that an efficiency of threshing increases as the input variable material feed height, which represents a throughput, increases and the smaller the concave width is.

8. The combine harvester according to claim 4, wherein the at least one family of characteristics (A-J) is assigned to the harvesting-process parameter separation losses based on a qualitative functional interrelationship that, as the material feed height, which represents the throughput, increases and the threshing-unit drum speed decreases, the separation losses increase.

9. The combine harvester according to claim 4, wherein the at least one family of characteristics (A-J) is assigned to the harvesting-process parameter separation losses based on a qualitative functional interrelationship that, as the material feed height, which represents the throughput, increases and the concave width increases, the separation losses increase.

10. The combine harvester according to claim 4, wherein the at least one family of characteristics is assigned to a harvesting-process parameter slip threshing-unit drive, which represents a threshing-unit load, based on a qualitative functional interrelationship that, as a material feed height, which represents throughput, increases and a drum speed decreases, a slip in a drive train of the threshing unit increases.

11. The combine harvester according to claim 10, wherein the at least one family of characteristics (A-J) is assigned to a harvesting-process parameter slip, which represents a threshing-unit load, based on a qualitative functional interrelationship that, as the material feed height increases and the concave width decreases, the slip in the drive train of the threshing unit increases.

12. The combine harvester according to claim 4, wherein the at least one family of characteristics (A-J) is assigned to the harvesting-process parameter broken grain portion based on a qualitative functional interrelationship that, as the drum speed increases and the material feed height decreases, the broken grain portion increases.

13. The combine harvester according to claim 4, wherein the at least one family of characteristics (A-J) is assigned to the harvesting-process broken grain portion based on a qualitative functional interrelationship that, as the material feed height, which represents the throughput, decreases, and the concave width decreases, the broken grain portion increases.

14. The combine harvester according to claim 4, wherein the at least one family of characteristics (A-J) is assigned to the harvesting-process parameter cleaning losses based on a qualitative functional interrelationship that, as the drum speed increases and the material feed height, which represents the throughput, increases, the cleaning losses increase.

15. The combine harvester according to claim 4, wherein the at least one family of characteristics (A-J) is assigned to the harvesting-process parameter cleaning losses based on a qualitative functional interrelationship that, as the concave width decreases and the material feed height, which represents the throughput, increases, the cleaning losses increase.

16. The combine harvester according to claim 4, wherein a premise is that a specification of the concave width is preferred over a specification of the drum speed for a setting or optimization of the threshing losses.

17. The combine harvester according to claim 16, wherein the premise is that the specification of the drum speed is preferred over a specification of the concave width for setting or optimization of the broken grain portion.

18. The combine harvester according to claim 16, wherein the computing unit specifies a reduction of the drum speed in order to reduce the broken grain portion.

19. The combine harvester according to claim 4, wherein the computing unit autonomously sets the threshing-unit parameter drum speed in a middle third and sets the harvesting-process parameter concave width in an upper third of respective setting ranges in order to implement the harvesting-process strategy comprising a sub-strategy of setting or optimization of the harvesting-process parameter slip threshing-unit drive and a sub-strategy of setting and optimization of the harvesting-process parameter broken grain portion.

20. The combine harvester according to claim 3, wherein the harvesting-process parameter material feed height and a threshing-unit parameter are input variables for the at least one family of characteristics (A-J).

21. The combine harvester according to claim 3, wherein an implementation instruction includes at least one premise, on a basis of which the computing unit, in the autonomous determination of the at least one threshing-unit parameter, implements a prioritization between one or more of the group consisting of: selected harvesting-process strategies, sub-strategies of a selected harvesting-process strategy, harvesting-process parameters to be set or optimized and threshing-unit parameters to be specified.

22. The combine harvester according to claim 21, wherein the at least one premise is that the computing unit always implements a setting or optimization of the broken grain portion before the selected harvesting-process strategy for setting or optimization of the threshing losses.

23. The combine harvester according to claim 2, wherein the computing unit generates queries related to a current harvesting-process state and outputs the queries via an input/output device and wherein, in response to a query, at least a portion of the field information comprising the harvesting-process state is entered via the input/output device.

24. The combine harvester according to claim 2, wherein the computing unit aligns the at least one family of characteristics (A-J) with the harvesting-process state during on-going harvesting operation cyclically, and, wherein in a first determination of the threshing-unit parameter, the computing unit carries out the determination on a basis of the family of characteristics (A-J).

25. The combine harvester according to claim 1, wherein at least one of the selectable harvesting-process strategies comprises at least two sub-strategies, and wherein each of the at least two sub-strategies is directed to a setting or optimization of the harvesting-process parameter.

26. The combine harvester according to claim 25, wherein a harvesting-process strategy balance comprises two weighted, balanced, sub-strategies of the setting or optimization of harvesting-process parameters separation losses and threshing losses.

27. The combine harvester according to claim 26, wherein at least one implementation instruction is stored in the memory, according to which the computing unit, based on the functional system model, carries out implementation of a particular selected harvesting-process strategy by determining the threshing-unit parameter.

28. The combine harvester according to claim 27, wherein the at least two sub-strategies of the particular selected harvesting-process strategy conflict with one another with respect to one and the same threshing-unit parameter.

29. The combine harvester according to claim 28, wherein the at least one implementation instruction includes a multi-objective optimization for simultaneous implementation of the mutually conflicting strategies.

30. The combine harvester according to claim 26, wherein the computing unit autonomously sets the threshing-unit parameters drum speed and concave width in an upper third of respective setting ranges in order to implement a harvesting-process strategy balance between the sub-strategies of the optimization of the harvesting-process parameter separation losses and the optimization of the harvesting-process parameter threshing losses.

31. A combine harvester including an automated threshing unit, the automated threshing unit comprising:
a threshing unit for threshing picked-up crop to obtain grain;
a driver assistance system for controlling the threshing unit, the driver assistance system comprising a memory for storing data and a computing unit for processing the data stored in the memory;
wherein a functional system model that depicts at least a portion of functional interrelationships for at least one part of the combine harvester, and a plurality of selectable harvesting process strategies are stored in the memory;
wherein the computing unit autonomously determines at least one threshing-unit parameter on a basis of the functional system model;
wherein a first family of characteristics (A, C, E, G, I) and a second family of characteristics (B, D, F, H, J) are assigned to at least one harvesting-process parameter, of a plurality of harvesting-process parameters, to depict the functional interrelationships;
wherein the at least one harvesting-process parameter forms an output variable for the first family and the second family of characteristics in each case;
wherein the computing unit specifies the at least one autonomously determined threshing unit parameter to the threshing unit, to thereby select and implement one of the selectable harvesting-process strategies; and
wherein the driver assistance system controls the threshing unit according to the implemented one of the selectable harvesting-process strategies.

32. The combine harvester according to claim 31, wherein the at least one harvesting-process parameter is selected from the group consisting of: threshing losses, broken grain portion, separation losses, cleaning losses, threshing-unit load and fuel consumption.

33. The combine harvester according to claim 31, wherein the at least one harvesting-process parameter is a material feed height, wherein the material feed height and a threshing-unit parameter drum speed form input variables for the first family of characteristics (A, C, E, G, I), and wherein the harvesting-process parameter material feed height and a threshing-unit parameter concave width form input variables for the second family of characteristics (B, D, F, H, J).

* * * * *